US007184908B2

(12) United States Patent
Mori

(10) Patent No.: US 7,184,908 B2
(45) Date of Patent: Feb. 27, 2007

(54) CALIBRATION METHOD OF TIME MEASUREMENT APPARATUS

(75) Inventor: Yasuo Mori, Kanagawa (JP)

(73) Assignee: Agilent Technologies, Inc., Palo Alto, CA (US)

(*) Notice: Subject to any disclaimer, the term of this patent is extended or adjusted under 35 U.S.C. 154(b) by 1 day.

(21) Appl. No.: 10/936,365

(22) Filed: Sep. 8, 2004

(65) Prior Publication Data

US 2005/0119846 A1 Jun. 2, 2005

(30) Foreign Application Priority Data

Nov. 28, 2003 (JP) ............................ 2003-398907

(51) Int. Cl.
*G01D 18/00* (2006.01)

(52) U.S. Cl. ........................................................ 702/89

(58) Field of Classification Search .................. 702/89; 368/118; 324/76.77, 389; 713/500; 968/844
See application file for complete search history.

(56) References Cited

U.S. PATENT DOCUMENTS 4,982,350 A * 1/1991 Perna et al. .................. 702/89
5,557,196 A * 9/1996 Ujiie ....................... 324/76.77
6,574,168 B2 * 6/2003 Hayashi ...................... 368/118
2004/0098634 A1 * 5/2004 Zerbe et al. ................ 713/500

FOREIGN PATENT DOCUMENTS

JP 09171088 A 6/1997

* cited by examiner

*Primary Examiner*—Bryan Bui
*Assistant Examiner*—Xiuqin Sun

(57) ABSTRACT

There is provided a calibration method for a time measurement apparatus having a time-voltage converter for converting the time interval of measurement signals and clock signals to voltage, an analog-digital converter for converting this voltage to digital values, and a time interval measurement device for measuring this time interval from these digital values. The method includes a calibration signal generation step for calibrating the calibration signals for the subperiod of these clock signals, with these calibration signals having a shorter period difference than the time which corresponds to the resolution of this analog-digital converter; a frequency distribution analysis step for repeatedly measuring these calibration signals, finding this digital value, and analyzing the cumulative frequency distribution of these digital values; and a calibration determining step for determining the calibration value of these digital values such that this cumulative frequency distribution is linear.

2 Claims, 10 Drawing Sheets

| Memory address | Data |
|---|---|
| 0 | 3030 |
| 1 | 3030 |
| 2 | 3030 |
| 3 | 3030 |
| F | F |
| address A- 1 | 4048 |
| address A | 48 |
| A+ 1 | 48 |
| A+ 2 | 48 |
| A+ 3 | 48 |
| A+ 4 | 48 |
| F | |
| A+ 1000 | 250 |
| A+1001 | 250 |
| F | |
| A+3999 | 4048 |
| A+4000 | 48 |
| A+40001 | 48 |
| F | |
| A+7999 | 4048 |
| A+8000 | 48 |
| A+8001 | 48 |
| A+8002 | 48 |
| F | F |
| A+100000 | 4048 |
| A+100001 | 4048 |
| A+100002 | 4048 |
| A+100003 | 48 |
| A+100004 | 48 |
| F | F |
| 1200000 | 3000 |

Fig 8a

CALIBRATION METHOD OF TIME MEASUREMENT APPARATUS

FIELD OF THE INVENTION

The present invention relates to a calibration method for a time measurement apparatus, and in particular, to a calibration method for a time measurement apparatus whereby the time interval between signals is measured by converting the time interval between measurement signals and clock signals to a voltage difference and analog-digital conversion of this voltage difference.

DISCUSSION OF THE BACKGROUND ART

A time measurement apparatus for accurately measuring the time interval between signals has become necessary as a result of the increase in the speed of digital communications in recent years. The signal interval is generally found by counting the clocks generated between signal inputs and adding the clock period to the number of counts. However, this measurement method cannot measure time intervals that are shorter than the clock period; therefore, although clock signals of a short period are necessary for obtaining good measurement accuracy, there are limits to the operating speed of the counter and this in turn limits measurement accuracy. Consequently, means for measuring times shorter than the clock period using a time-voltage converter and analog-digital converter (ADC) have been added to the conventional measurement method using a counter in order to make very accurate measurements possible without raising the clock frequency. The structure of a typical measurement apparatus of this type is shown in FIG. 2.

The time measurement apparatus in FIG. 2 is a measurement apparatus for measuring the time interval from when a signal edge is input to the start input to when a signal edge is input to the stop input. It comprises a ramp generator 100 for generating ramp signals, which is connected to the start input; a clock generator 101; a sample hold circuit (S/H circuit) 102 for holding ramp signal voltage during one clock period, which is connected to ramp generator 100 and clock generator 101; an analog-digital converter (ADC) 103 for converting S/H signals to digital signals, which is connected to S/H circuit 102; a ramp generator 200 to which the “stop signal input” has been connected; a sample hold circuit (S/H circuit) 202 for holding ramp signal voltage for one clock period, which is connected to ramp generator 200 and clock generator 101; an analog-digital converter (ADC) 203 for converting S/H signals to digital signals, which is connected to S/H circuit 202; a counter 104 for counting clock signals from event detection signal 1 to event detection signal 2, this counter being connected to clock generator 101 and ramp generators 100 and 200; and a processor 105 for calculating the time from start signal input to stop signal input, this processor being connected to clock generator 101, ADCs 103 and 203, and counter 104.

The operation of the time measurement apparatus in FIG. 2 will be described while referring to FIG. 3. Ramp generator 100 outputs a pre-determined voltage under normal conditions, but when a measurement signal is input to the “start input”, ramp signals that increase linearly from a pre-determined voltage are output based on the rising edge of the measurement signals. Under normal conditions, S/H circuit 102, which has input the ramp signals, continuously outputs a certain voltage without ramp operation, but when the rising edge of first clock signal (CLK) after “start input” is input, the ramp output is held for one CLK period. During this holding time, processor 105 finds a time interval (T1) from when measurement signals are input to “start input” up to the CLK input that immediately follows based on the sample data obtained when ADC 103 has converted the input voltage to digital values and the potential difference from the voltage output by the ramp generator under normal conditions. At the same time, a time interval (T2) from when measurement signals are input to “stop input” up to “CLK signal input” that immediately follows can be found. S/H circuit 202 returns to the voltage under ordinary conditions once the holding period is over.

On the other hand, when measurement signals are input to “start input”, ramp generator 100 outputs event detection signals to counter 104. These signals are generated as signals that are delayed by one period from the rise of the next CLK of the start signal. These event detection signals are handled as reset signals. The count of counter 104 is set at 0 by this reset signal and counts up from the next pulse input. Consequently, the number of clocks (N) generated from the “start signal input” to the “stop signal input” can be obtained by referring to the count value when event detection signals are generated from ramp signal generator 200 by the “stop signal input”.

Processor 105 calculates the time interval (T) from the “start signal input” to the “stop signal input” based on these measurement results. Specifically, when the CLK period is TC, $T = N \times TC + T1 - T2$.

Thus, it becomes possible to measure a time interval that is shorter than the time until the ramp generator returns to ordinary conditions by using two sets comprised of a combination of a ramp generator, an S/H circuit, and an ADC, with one set being employed for the signal from the start input and the other set being employed for the signal from the stop input.

By means of the above-mentioned measurement apparatus in FIG. 2, the measurement of a time interval that is much more accurate than the clock signal is possible theoretically. However, there is a problem in that sufficient measurement accuracy is not actually realized because a high-speed time-voltage converter or an ADC having good linear conversion properties does not exist. Therefore, technology exists where measurement accuracy is improved by pre-inputting calibration signals into the measurement apparatus and calibrating by the values found from these measurement results, as disclosed in JP (Kokai) 9[1997]-171,088. By means of this calibration method, calibration signals having different periods are generated randomly as measurement signals, the frequency distribution (histogram of sample count) of the measured calibration signals versus time is charted, and the measurement is calibrated by the value found from this frequency distribution. If the number of samples is sufficient, the frequency distribution should be approximately uniform; therefore, if the calibration value is determined such that the frequency distribution is equalized, a value that is approximately the true value is obtained.

However, it takes a very long time to determine the calibration value even when there are enough samples to improve accuracy. Moreover, there is no method for generating completely random numbers. Therefore, there is a problem in that measurement accuracy cannot be guaranteed.

SUMMARY OF THE INVENTION

A calibration method for a time measurement apparatus comprising a time-voltage converter for converting the time interval of measurement signals and clock signals to voltage, an analog-digital converter for converting the voltage to digital values, and a time-interval measurement unit for measuring the time interval of measurement signals from the digital values, the method comprising: generating calibration signals for a subperiod of the clock signals, with the calibration signals having a shorter period difference than the time corresponding to the resolution of the analog-digital converter; measuring the calibration signals, finding the digital values, and analyzing the cumulative frequency distribution of the digital values; and determining the calibration value for the digital values such that the cumulative frequency distribution is linear.

Preferably, the period difference is the divisor of the time which corresponds to resolution.

Preferably, the step of generating calibration signals comprises: measuring the period of the clock signals; and shifting the period of the calibration signals by the period difference.

Preferably, the analyzing of the frequency distribution begins after the time interval of the calibration signals and clock signals becomes shorter than the time which corresponds to resolution.

Another embodiment according to the present invention includes a calibration method for a time measurement apparatus comprising a time-voltage converter for converting the time interval of measurement signals and clock signals to voltage, an analog-digital converter for converting the voltage to digital values, and a time-interval measurement unit for measuring the time interval from the digital values, the method comprising: generating calibration signals for the subperiod of the clock signals, with the calibration signals having a shorter period difference than the time which corresponds to the resolution of the analog-digital converter; measuring the calibration signals, finding the digital values, and analyzing the frequency distribution of the digital values; and determining the calibration value for the digital values such that the frequency distribution is equalized.

The present invention also includes a time measurement apparatus comprising: a clock signal generator for generating clock signals; a time-voltage converter for converting the time interval between measurement signals and the clock signals to voltage; an analog-digital converter for converting the voltage to digital values; a calibration signal generator for generating calibration signals for the subperiod of the clock signals, with the calibration signals having a shorter period difference than the time which corresponds to the resolution of the analog-digital converter; and a calibration analyzer for measuring the calibration signals, finding the cumulative frequency distribution of the digital values, and determining the calibration value for the digital values such that the cumulative frequency distribution becomes linear.

Preferably, the time measurement apparatus may optionally include an external input terminal for inputting the calibration signals and/or the clock signals from outside the time measurement apparatus.

BRIEF DESCRIPTION OF THE DRAWINGS

FIG. 8*a* is a table showing the contents of the memory in the ramp calibration step according to the present invention.

DETAILED DESCRIPTION OF THE PREFERRED EMBODIMENT

A calibration method for a time measurement apparatus that has time-voltage converter for converting the time interval of measurement signals and clock signals to voltage, analog-digital converter for converting this voltage to digital values, and time-interval measurement unit for measuring this time interval from these digital values, wherein it comprises a calibration signal generation step for calibrating the calibration signals for the subperiod of these clock signals, with these calibration signals having a shorter period difference than the time corresponding to the resolution of this analog-digital converter; a frequency distribution analysis step for repeatedly measuring these calibration signals, finding these digital values, and analyzing the cumulative frequency distribution of these digital values; and a calibration determining step for determining the calibration value for these digital values such that this cumulative frequency distribution is linear.

That is, when signals having a period that is somewhat different from the subperiod signals of the clock signals are used as the calibration signals, the cumulative frequency distribution is theoretically a perfectly linear distribution because the time interval between the clock signals and the calibration signals increases arithmetically. Consequently, measurement with high accuracy is possible as long as the amount of calibration is such that the cumulative frequency distribution of the actual measurement results becomes a linear distribution.

A testing apparatus and a method that are preferred embodiments of the present invention will be described in detail while referring to the attached drawings.

Figure 1:
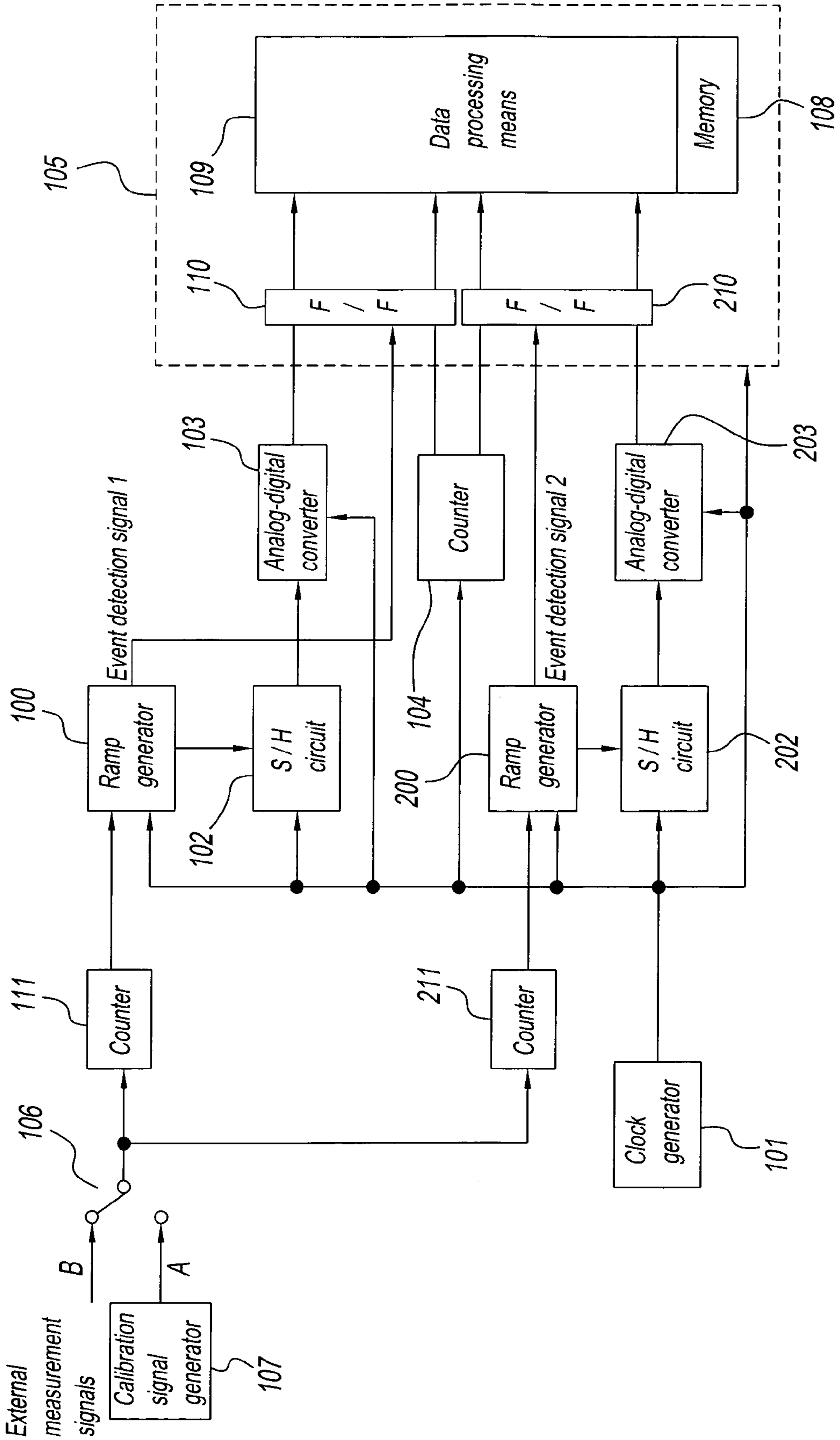
FIG. 1 is a block diagram of the measurement apparatus of according to one embodiment of the present invention.

FIG. 1 is a rough sketch of the structure of the time measurement apparatus of the present invention. The time measurement apparatus in FIG. 1 comprises: a calibration signal generator 107; a switch (SW) 106; counters 111 and 211 for dividing the input signals connected to switch 106; ramp generators 100 and 200, which are time-voltage converter connected to counters 111 and 211; a clock generator 101 for generating 50 mHz rectangular waves; S/H circuits 102 and 202 connected to ramp generators 100 and 200 and clock generator 101; analog-digital converters 103 and 203, which have ADC chips for both power sources with a resolution of 12 bits and are connected to S/H circuits 102 and 202; a counter 104 connected to clock generator 101; and a processor 105 connected to counter 104 and ramp generators 100 and 200.

Figure 5:
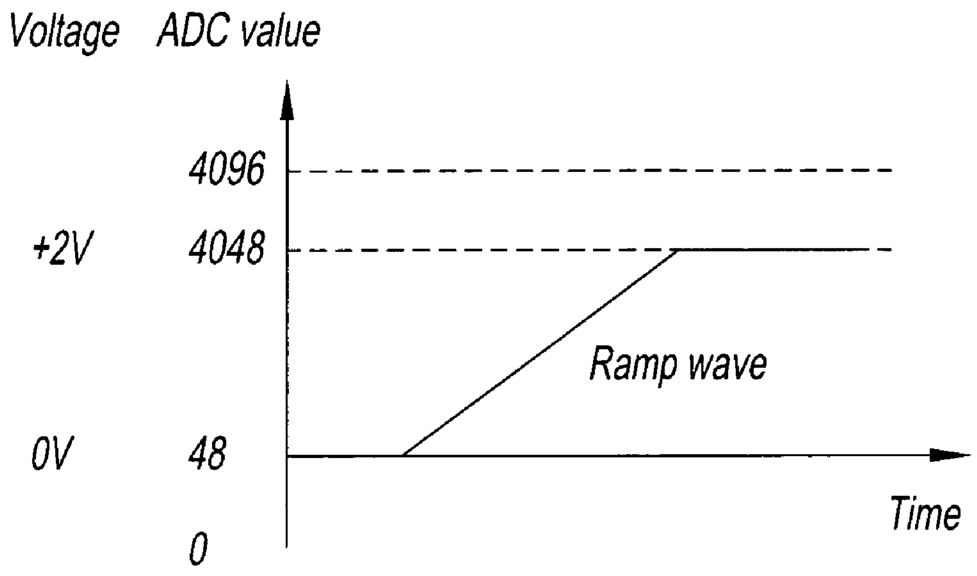
FIG. 5 is a diagram relating to the ramp signals and ADC scale according to the present invention.
Figure 6:
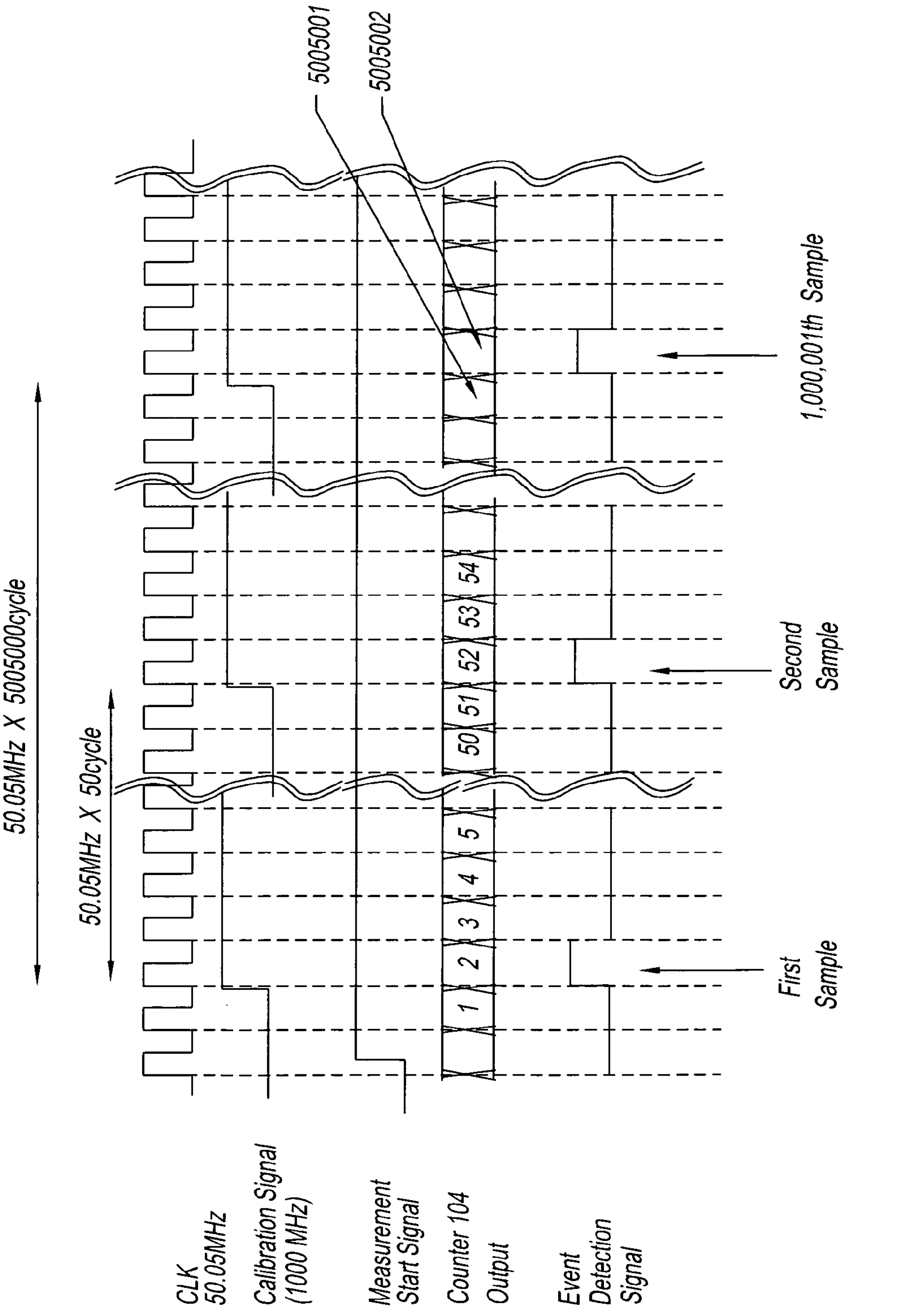
FIG. 6 is a diagram showing changes over time in signals during the frequency analysis step according to the present invention.

As shown in FIG. 5, ramp generators 100 and 200 output a constant voltage of +0 V (GND) under ordinary circumstances, but when signals are input, ramp signals that increase linearly at a ratio of 0.1 V every 1 ns are output based on the rising edge of the signal. Ramp signals that have been input are output by S/H circuits 102 and 202 without further treatment under ordinary circumstances. Nevertheless, when the rising edge of the first clock signal after ramp signal input is input, the voltage of the ramp signal at this point is held for one CLK period, that is, for 20 ns. This is because ADC chips with a conversion time of 20 ns are used for analog-digital converters 103 and 203. Analog-digital converters 103 and 203 convert the analog value or voltage that has been input with each CLK input to digital values and output that values during this hold period. The digital values to which the voltage was converted by analog-digital converters 103 and 203 are latched by flip-flops (F/F) 110 and 210 inside data processor 105 and used as data for time measurement. On the other hand, ramp generators 100 and 200 start operating such that the output voltage during the holding period returns to the 0 V of ordinary conditions and the next calibration signal input is put on hold.

A calibration signal generator 107 is pre-calibrated from an NIST high-ranking measurement apparatus of higher accuracy than this apparatus. Counter 104 receives measurement start signals, resets, and begins to count. Switch 106 connected to the input side of counters 111 and 211 is such that outside measurement signals (start input and stop input collectively represented as outside measurement signals) and calibration signals from calibration signal generator 107 are selected as the input signals. By means of the present working example, a relay is used as switch 106, but another type of mechanical switch, or an electronic switch such as a transistor switch, can be used. Clock generator 101 and calibration signal generator 107 can be kept inside the time measurement apparatus, or they can be external accessories shared with other measurement apparatuses. The time measurement apparatus of the present working example houses clock generator 101, but external input terminals for clock signals and calibration signals can be set up such that the measurement apparatus can be operated by clock signals from the outside. Processor 105 has F/Fs 110 and 210 connected to analog-digital converter 103 and counter 104; a data processor 109 for calculating the time interval, the data processor 109 being connected to F/F 110 and 210; and a memory 108. F/F 110 latches data from counter 104 for each event detection signal and sends these data to data processor 109. Data processor 109 sends count data latched to each event detection signal to memory 108. Data for each latch are recorded by memory 108.

Next, the operation of the time measurement apparatus pertaining to the present invention will be described. This measurement apparatus has two operating modes: a calibration mode and a measurement mode. The calibration mode is the mode that determines the calibration value that will be used by data processor 109 from calibration signals, and the measurement mode is the mode that measures the measurement signals from the outside.

The calibration mode can be further divided into a frequency analysis step and a ramp calibration step. The frequency analysis step is the step whereby the generation frequency of the clock generator is found by high-accuracy calibration signal generator 107, and the ramp calibration step measures in order to obtain data for calibration of the linearity of ramp generators 100 and 200 and analog-digital converters 103 and 203.

These modes and steps are described in detail below.

Figure 7A:
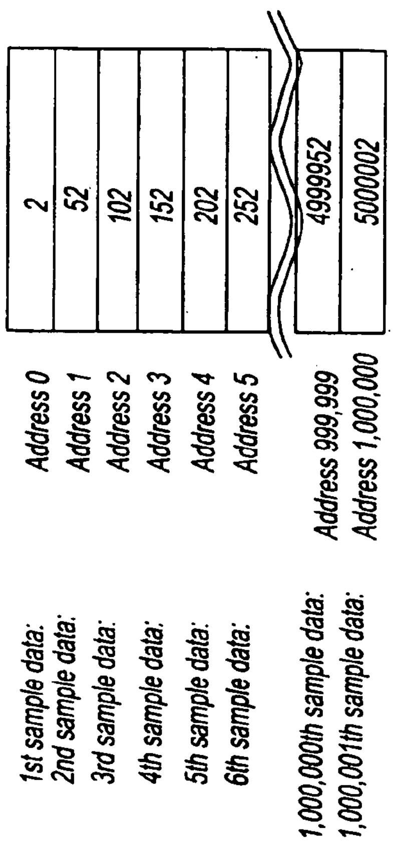
FIG. 7*a* is a table showing the contents of the memory in the frequency analysis step according to the present invention.
Figure 7B:
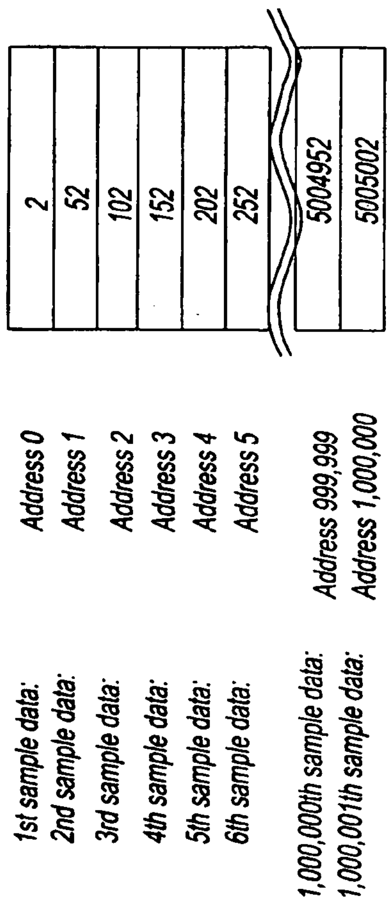
FIG. 7*b* is a table showing the contents of the memory in the frequency analysis step according to the present invention.

The frequency analysis step finds the frequency difference between two asynchronous generation sources (clock generator 101 and calibration signal generator 107) using the theory of frequency counter measurement. SW 106 is connected to side A in this step. Calibration signal generator 107 outputs a 1 MHz pulse. The period of the pulses generated by calibration signal generator 107 should be longer than the operating period of the ramp signals, that is, the total return time until the signal holding period and ramp signals are returned to ordinary voltage by S/H circuit 102. Counter 111 is set at "0" at this time and the signals from calibration signal generator 107 are sent to ramp generator 100 without being divided. Therefore, the calibration signals output a period corresponding to an integral multiple (usually a multiple of three to thirty) of the clock signals (50 Hz, period of 20 ns) from clock generator 101, that is, a period corresponding to clock subsignals (however, the calibration signals are independent from the clock signals and are not made by dividing the clock signals). Moreover, when signals of the same period as the clock signals are generated from calibration signal generator 107, the same signals are sent to ramp generator 100 by setting the value of counter 111 at 50. Ramp generator 100 generates event detection signals for each input of calibration signals, that is, every one microsecond. Data processor 109 operates such that the data from analog-digital converter 103 are not stored and only the data from counter 104 are sent to memory 108 in the frequency analysis step. When clock generator 101 outputs exactly 50.00 MHz, the count recorded every 1 MHz normally increases every 50 counts and, as shown in FIG. 7*a*, the value obtained by subtracting the data at the time of the first event from the data when the 1,000,0001th event was detected should be 50,000,000. Nevertheless, as shown in FIG. 7*b* for instance, when clock generator 101 outputs 50.05 MHz, the figure obtained by subtracting data at the time of the first event from data when the 1,000,0001th event is detected becomes 50,050,000. The difference between the period of clock generator 101 and that of calibration signal generator 107 can thereby be found.

When the above-mentioned period difference is added and the counter is set to "0," the frequency of the calibration signals used for ramp calibrated measurement is set according to the following formula:

Calibration signal frequency=1/(time shift needed for each sample+measurement period)

The procedure in the ramp calibration step will now be described. Ramp generator 100, S/H circuit 102, and analog-digital converter 103 are calibrated in the following description, but ramp generator 200, S/H circuit 202, and analog-digital converter 203 are also calibrated in succession in the same order.

In contrast to the frequency analysis step, the output of counter 104 is disregarded in the ramp calibration step and only the output of analog-digital converter 103 is recorded as effective. A 12-bit ADC device is used for a 20 ns ramp generator in the present working example, but using the full scale of the ADC runs the risk of over-range due to noise and therefore, the scale is adjusted so that the ADC is used within the range of 48 to 4,048. The resolution at this time becomes 20 ns/4,000=5 ps. The calibration signals are set to a shift of 1 ps per sample. Thus, the rising edge of the calibration signals and the rising edge of the clock signals shift by 1 ps every period; therefore, the digital values output from analog-digital converter 103 increase by one every five measurements. In other words, measurements are performed five at a time at the resolution (5 ps) of the analog-digital converter. The data housed in memory 108 as a result of performing 120,000 measurements in this way are shown in FIG. 8*a*.

Properly speaking, because measurements are performed five at a time for 4,000 digital values, the calibration data for all digital values are obtained by performing a minimum of 20,000 measurements. However, the time interval between the calibration signals and the CLK signals is unknown at the measurement start point; thus, the cumulative frequency distribution is found once the [digital values have] decreased from 4,048 to 48 after starting the measurements. Looking at previously recorded data, there will be a time when the digital values increase from 40 to 4,048 once the final data have been recorded. Using this as the start address point, the memory is searched from the end back and the data where the part that first shows an increase from 48 to 4,048 which serves as the stop address point are used to find the frequency distribution (histogram) and the cumulative frequency distribution.

There are jitters in the calibration signals and CLK and noise is present in the ADCs. Therefore, data were recorded in memory 108 after filtering the noise by applying a filter to the output of analog-digital converter 103 in the present example, but when the output of analog-digital converter 103 is recorded untreated, there is an increase in the Gaussian noise content. In this case, the initial data are searched for a reduction by a value close to 4,000 (for instance, 3,800) and the place where the data point is housed becomes the starting address point. The cumulative frequency distribution can also initially be found near the final data point as the memory address end point that deviates by approximately 4,000, for instance, 3,800 or greater.

Figure 8B:
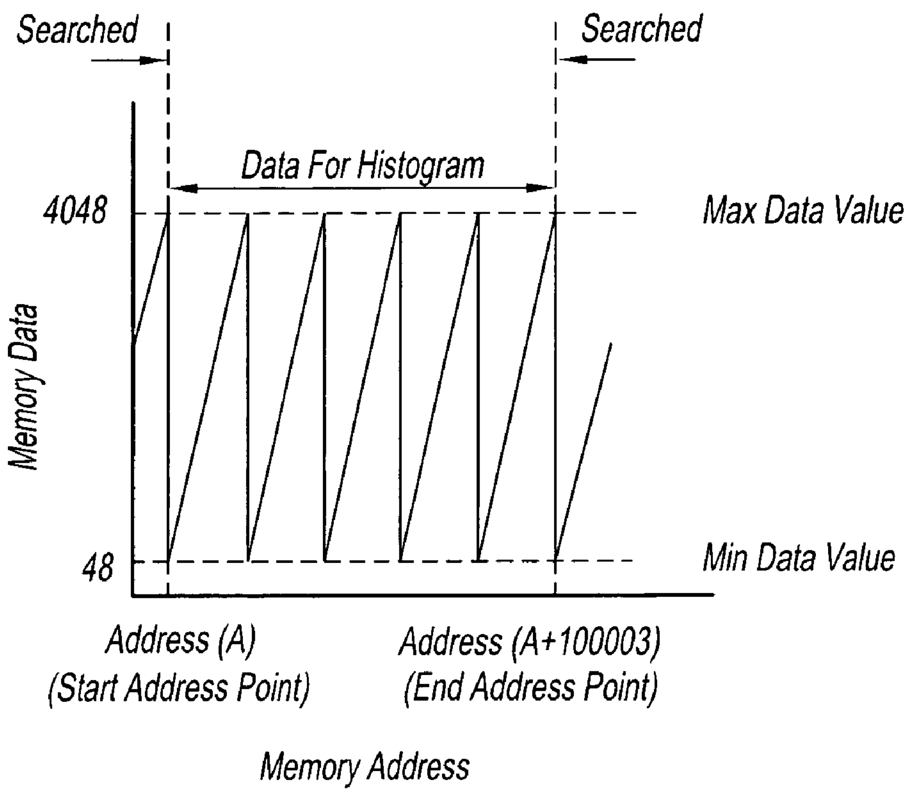
FIG. 8*b* is a chart plotting the memory address versus memory data.

As shown in FIG. 8*a* and FIG. 8*b*, the start address point is address (A), and the end address point is address (A+100003). The data measured by ADC can be made into uniform conditions by using data from address(A) to address (A+100003). The data between the start address point and the end address point is used for the histogram.

Especially, this method provides a reasonably accurate value for the boundary points between the minimum time measured by CLK and the maximum time measured by analog-digital converter. In other words, the boundary points are two rising edges of CLK 1 cycle and also the min and max digital value of frequency distribution (histogram) measured by analog-digital converter.

Figure 4A:
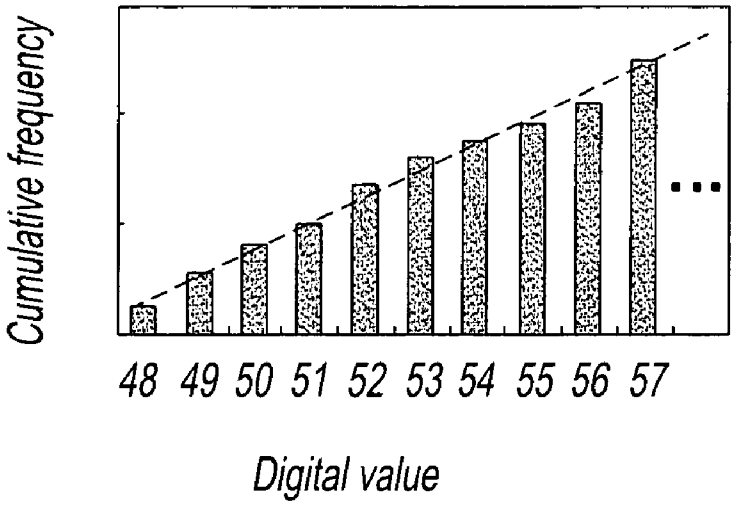
FIG. 4*a* is a chart plotting the cumulative frequency distribution versus digital value according to the present invention.
Figure 4B:
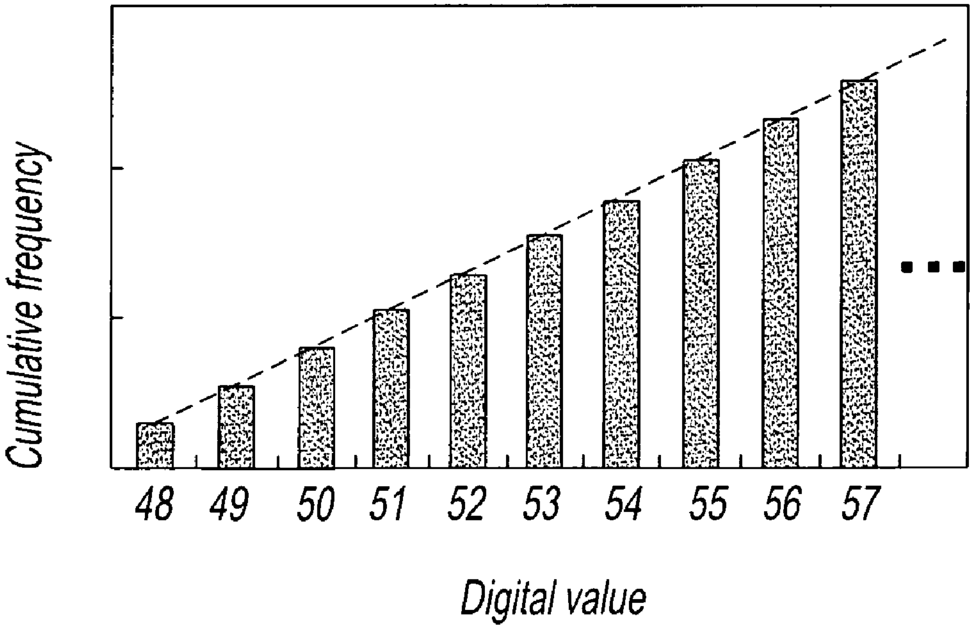
FIG. 4*b* is a chart plotting the ideal cumulative frequency distribution versus digital value.
Figure 4C:
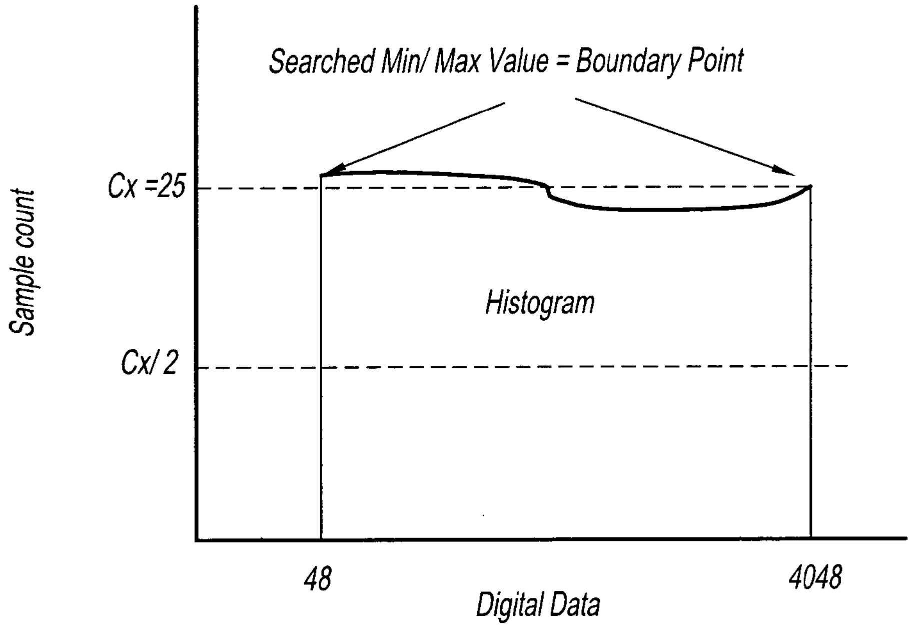
FIG. 4*c* is a chart plotting the frequency distribution obtained from acquired digital data.
Figure 4D:
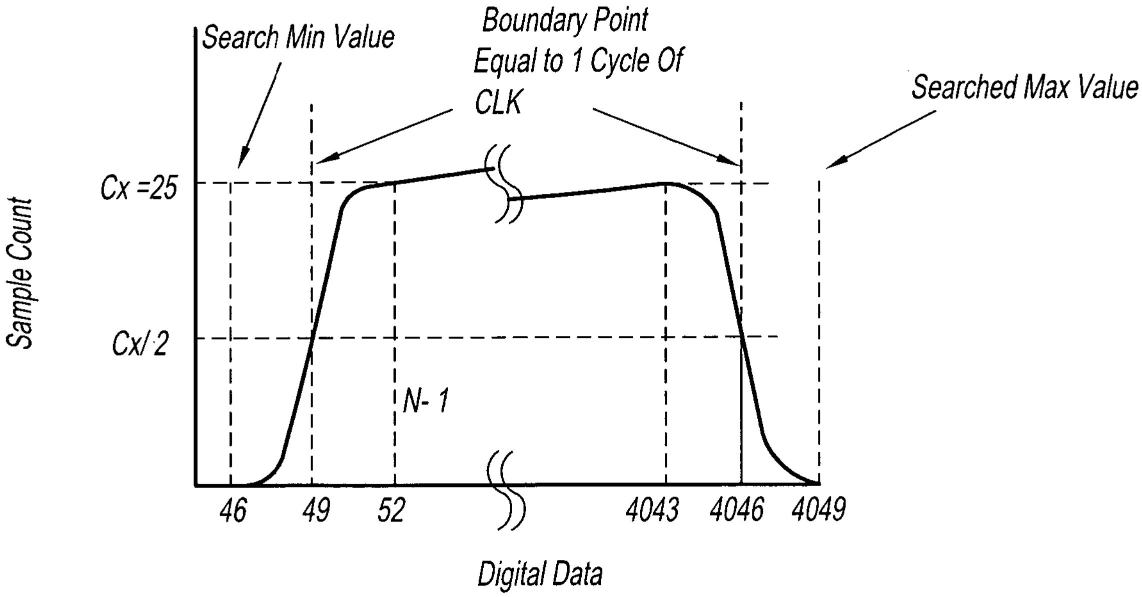
FIG. 4*d* is a chart plotting the frequency distribution obtained from acquired digital data.

The frequency distribution (histogram) and the frequency distribution are obtained from acquired digital data, shown in FIG. 4*c* and FIG. 4*d*. If histogram is flat, then the cumulative frequency distribution is ideal, shown in FIG. 4*b*. The characteristic the cumulative frequency distribution is equivalent to linearity of ramp generator and ADC.

If jitter and noise cannot be disregarded, then the searched min and max digital values do not become the boundary point directly. In this case, the shape of histogram near the min and max digital values do not the expected value steeply shown in FIG. 4*d*. The expected value, (Cx) is the average of number captured per digital value. If acquired data is shown as FIGS. 8*a* and 8*b*, Cx is approximately 25 (=100, 003 sample/(max data−min data).

The boundary point becomes to the code with the value of the half of Cx. In case of FIG. 4*d*, min data=46, max data=4049, Cx=25. In this case where the digital values that have sample count as Cx/2.=min 49, max 4046, the boundary points become 49 and 4046. At actual measurement, if captured digital values are in 46 to 48 or 4047 to 4049, the extrapolation method is used.

As long as ramp generator 100 and analog-digital converter 103 have ideal properties, the frequency distribution will increase linearly with the digital values, as shown in FIG. 4*b*. However, ideal elements and circuits do not exist and therefore, the distribution is the actual one such as that shown in FIG. 4*a*. Therefore, data processor 109 determines the calibration function such that this frequency distribution becomes linear. That is, data processor 109 approximates the cumulative frequency distribution by a secondary function and this inverse function serves as the calibration function. The calibration mode ends at a higher function. Furthermore, the calibration function is not limited to a secondary function, and any function can be selected. In addition to the method whereby the calibration function is found such that the cumulative frequency distribution for the digital values is linear as in the working example, it is also possible to determine the calibration function such that the frequency distribution of the digital values is found and equalized. It is also possible to find the difference from the ideal distribution for each digital value and chart the calibration data without using a calibration function.

Figure 2:
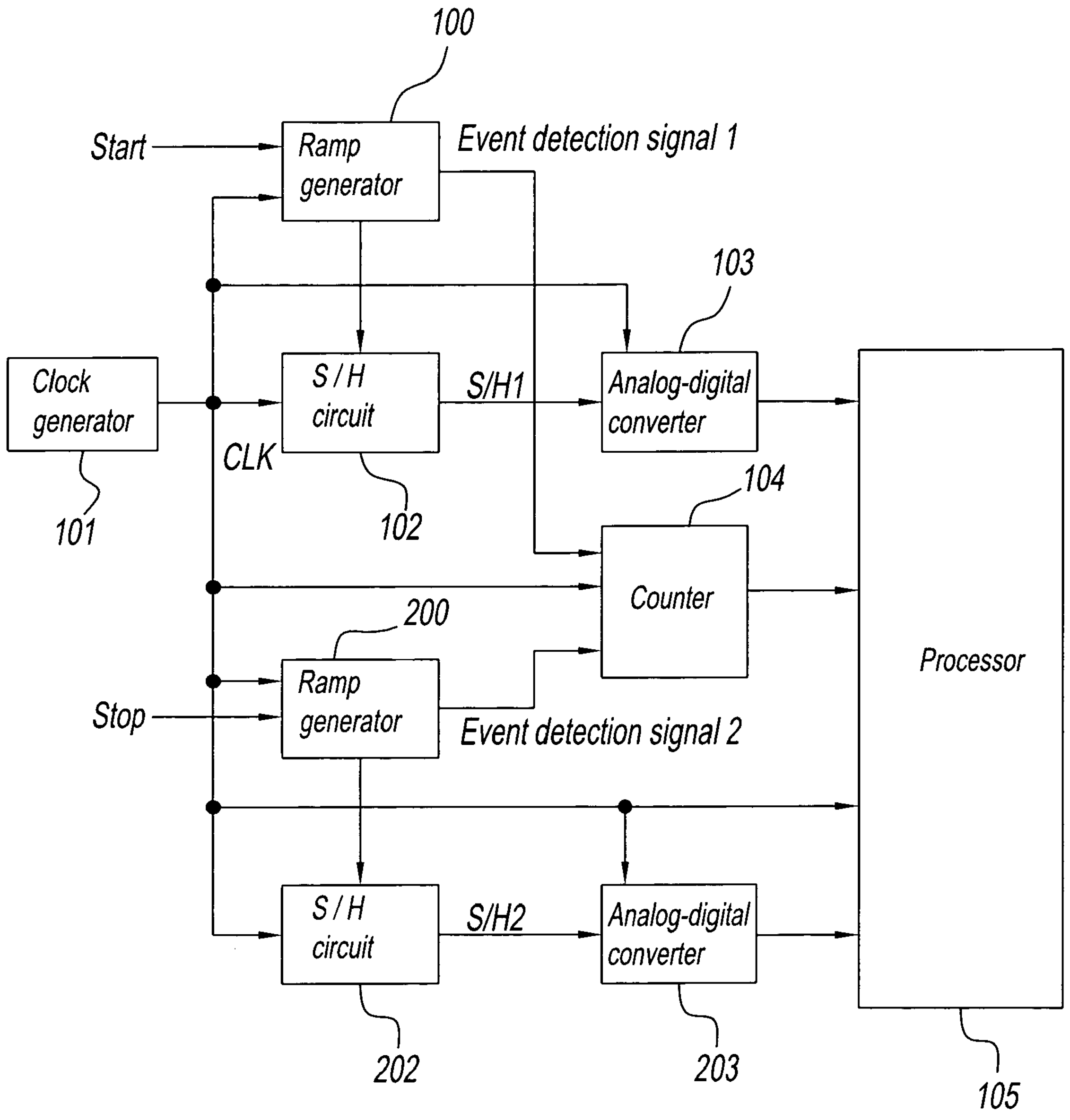
Fig. 2 (Prior Art)
FIG. 2 is a block diagram of the measurement apparatus according to the prior art.
Figure 3:
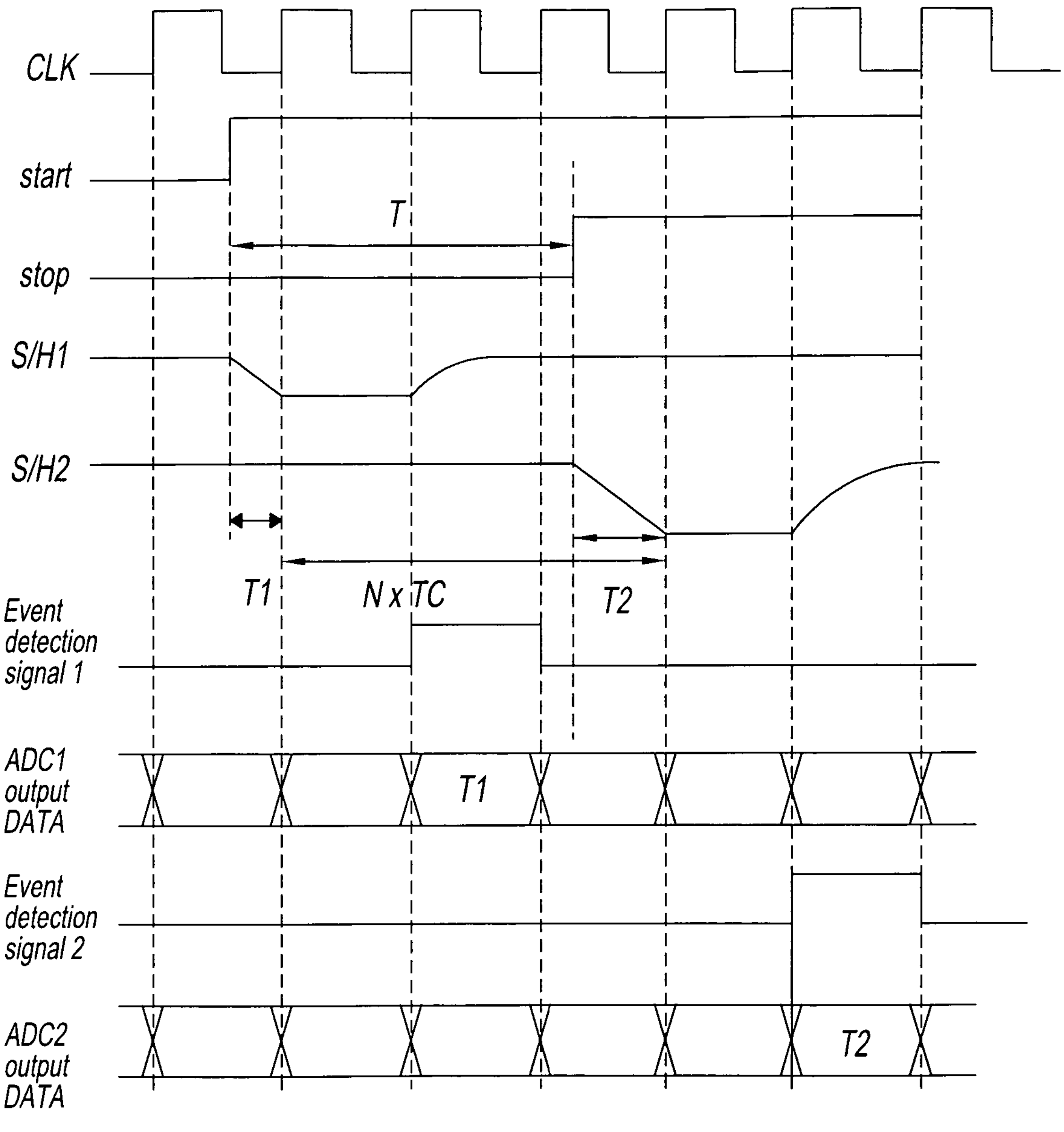
Fig. 3 (Prior Art)
FIG. 3 is a chart showing changes over time in the signals of a measurement apparatus according to the prior art.

Finally, the operation of the measurement apparatus in measurement mode will be described. Switch 106 is connected to B in the measurement mode. The measurement signals are divided into pre-determined periods by counters 111 and 211 and input to ramp generators 100 and 101. Ramp generators 100 and 200, S/H circuits 102 and 202, analog-digital converters 103 and 203, and counter 104 have the same functions as in the calibration mode. Calibration signal generator 107 is in the non-operating state. As with measurement apparatus 105 in FIG. 2, data processor 109 calculates the time interval of the measurement signals from the output data from analog-digital converter 103 and counter 104. However, the output data of analog-digital converter 103 are converted to digital values in accordance with the calibration value (calibration function or calibration value) determined by the calibration mode prior to calculation. Extremely accurate measurement results can thereby be obtained.

It is possible to very accurately determine the calibration value in a short time by the calibration method of the present invention. Thus, it is possible to provide a time measurement apparatus with which the time needed for calibration is short and measurement accuracy is high.

The above-mentioned working example and revised version thereof are but one embodiment for describing the present invention set forth in the claims, and it is clear to persons skilled in the art that various revisions can be made within the scope of these claims.

What is claimed is:

1. A calibration method for a time measurement apparatus comprising a time-voltage converter for converting the time interval of measurement signals and clock signals to voltage, an analog-digital converter for converting said voltage to digital values, and a time-interval measurement unit for measuring said time interval of measurement signals from said digital values, said method comprising:

generating calibration signals for a subperiod of said clock signals by measuring the period of said clock signals, and shifting the period of said calibration signals by said period difference, with said calibration signals having a shorter period difference than the time corresponding to the resolution of said analog-digital converter;

measuring said calibration signals, finding said digital values, and analyzing the cumulative frequency distribution of said digital values;

determining a calibration value for said digital values such that said cumulative frequency distribution is linear;

converting said voltage converted by said time-voltage converter to said digital values in accordance with said calibration value; and measuring said time interval of measurement signals from said digital values converted in accordance with said calibration value, wherein said time interval is outputted to a predetermined apparatus or stored in a memory of said time-interval measurement apparatus.

2. A calibration method for a time measurement apparatus comprising a time-voltage converter for converting the time interval of measurement signals and clock signals to voltage, an analog-digital converter for converting said voltage to digital values, and a time-interval measurement unit for measuring said time interval of measurement signals from said digital values, said method comprising:

generating calibration signals for a subperiod of said clock signals, with said calibration signals having a shorter period difference than the time corresponding to the resolution of said analog-digital converter;

measuring said calibration signals, finding said digital values, and analyzing the cumulative frequency distribution of said digital values, wherein the analyzing of said frequency distribution begins after the time interval of said calibration signals and clock signals becomes shorter than said time which corresponds to resolution;

determining a calibration value for said digital values such that said cumulative frequency distribution is linear;

converting said voltage converted by said time-voltage converter to said digital values in accordance with said calibration value; and measuring said time interval of measurement signals from said digital values converted in accordance with said calibration value, wherein said time interval is outputted to a predetermined apparatus or stored in a memory of said time-interval measurement apparatus.

* * * * *